(12) United States Patent
Martinez et al.

(10) Patent No.: US 8,305,680 B2
(45) Date of Patent: Nov. 6, 2012

(54) STABLE MOUNTING OF NON-LINEAR OPTICAL CRYSTAL

(75) Inventors: Manuel Martinez, Fremont, CA (US); Mark W. Byer, Mountain View, CA (US); Derek J. Richard, Tracy, CA (US)

(73) Assignee: Disco Corporation, Tokyo (JP)

( * ) Notice: Subject to any disclaimer, the term of this patent is extended or adjusted under 35 U.S.C. 154(b) by 184 days.

(21) Appl. No.: 12/854,844

(22) Filed: Aug. 11, 2010

(65) Prior Publication Data
US 2012/0038973 A1    Feb. 16, 2012

(51) Int. Cl.
G02F 1/35    (2006.01)
G02F 2/02    (2006.01)
H01S 3/10    (2006.01)

(52) U.S. Cl. .......................................... 359/326; 372/22
(58) Field of Classification Search .................. 385/122; 359/326–332; 372/21–22
See application file for complete search history.

(56) References Cited

U.S. PATENT DOCUMENTS

| | | | |
|---|---|---|---|
| 4,348,365 A | 9/1982 | Gubitose et al. | |
| 5,220,459 A | 6/1993 | Ichikawa et al. | |
| 5,341,388 A | 8/1994 | Masuda et al. | |
| 5,737,346 A * | 4/1998 | Stenstrom | 372/21 |
| 6,631,231 B2 | 10/2003 | Mizuuchi et al. | |
| 6,633,428 B2 * | 10/2003 | Abe et al. | 359/326 |
| 6,699,565 B2 | 3/2004 | Kikuchi et al. | |
| 6,999,668 B2 * | 2/2006 | Yokoyama et al. | 385/129 |
| 7,482,735 B2 * | 1/2009 | Harada et al. | 310/348 |
| 7,710,638 B2 * | 5/2010 | Yoshino | 359/332 |
| 2007/0237481 A1 | 10/2007 | Yoshino et al. | |

OTHER PUBLICATIONS

PCT/2011/044860 International Search Report and the Written Opinion dated Nov. 16, 2011.

* cited by examiner

*Primary Examiner* — Daniel Petkovsek
(74) *Attorney, Agent, or Firm* — Joshua D. Isenberg; JDI Patent

(57) ABSTRACT

A nonlinear optical crystal can be mounted to a mounting block configured to receive the crystal. The crystal can be mounted to the mounting block with a face of the crystal abutting a surface of the mounting block. An adhesive secures the crystal to the mounting block by adhering to the bottom and/or sidewall of the channel and to at least corresponding a portion of the bottom and/or side face of the crystal proximate an edge of the crystal.

37 Claims, 5 Drawing Sheets

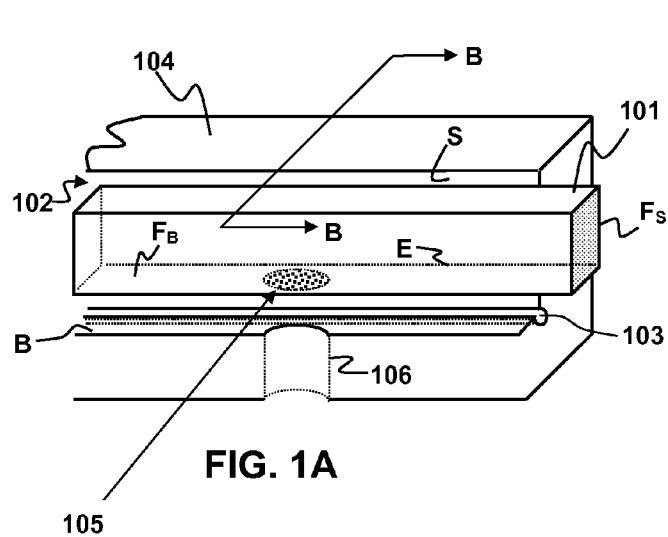
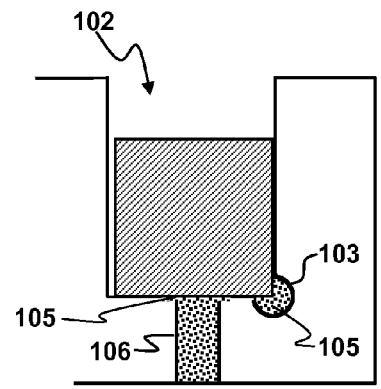
FIG. 1A
FIG. 1B
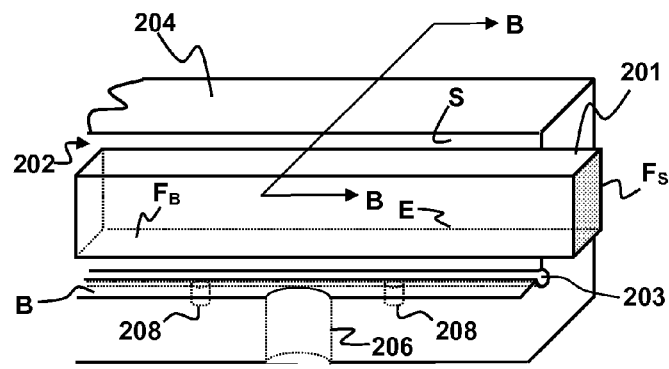
FIG. 2A
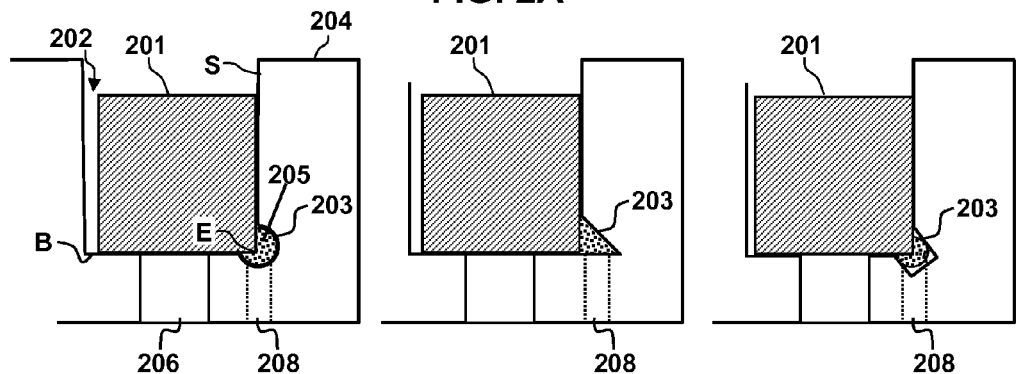
FIG. 2B        FIG. 2C        FIG. 2D

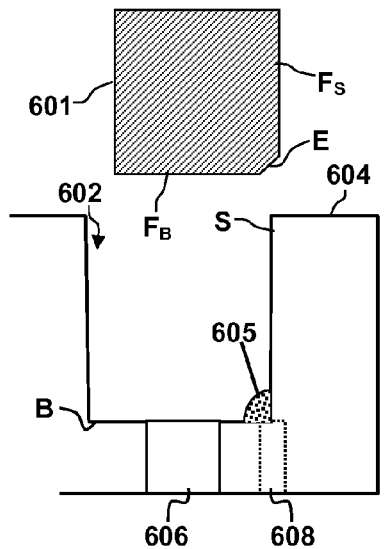
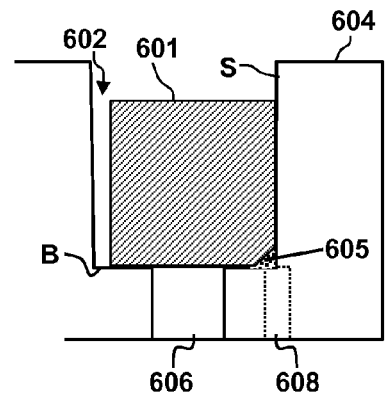
FIG. 6A    FIG. 6B
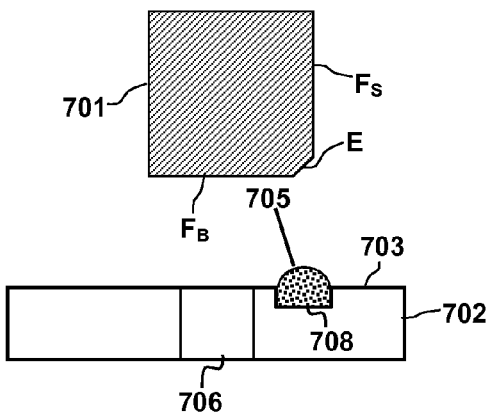
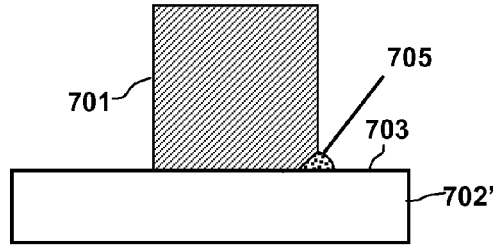
FIG. 7A    FIG. 7B

STABLE MOUNTING OF NON-LINEAR OPTICAL CRYSTAL

FIELD OF THE INVENTION

Embodiments of this invention generally relate to lasers and optical amplifiers and more particularly to wavelength converted optical systems with an improved mount for a non-linear optical crystal.

BACKGROUND OF THE INVENTION

Optical systems generally require the precise and rigid alignment of lenses, prisms, mirrors, and other optical components. Proper alignment is especially important in laser systems, where misalignment of the optical components can degrade performance. In addition, frequency doubling and other nonlinear processes involving crystals often require that the crystal be precisely aligned in order to achieve the optimum conversion efficiency to meet stringent beam performance requirements.

Stable alignment is therefore especially critical for both intracavity and extracavity, nonlinear crystal resonator configurations, in which the crystal may or may not reside within the resonator.

Alignment problems are considerably aggravated when the laser system is subjected to vibrations. Temperature cycling presents problems as well, since the optical components may expand and contract with changes in temperature at different rates. To minimize alignment problems, specialized optical mounts are frequently used to secure optical components.

In a wavelength-converted laser system, laser radiation undergoes a nonlinear optical process in some nonlinear medium, such as a nonlinear optical crystal. The nonlinear optical process converts some portion of the laser radiation to a different wavelength. The phase matching of a nonlinear crystal is typically adjusted by (1) precise cuts on the crystalline axis, (2) precise mounting of the crystal, (3) controlling the temperature of the crystal. The crystal is typically mounted to a specially-designed oven and the temperature of the crystal is adjusted by adjusting the temperature of the oven.

Examples of non-linear crystals include, but are not limited to, lithium niobate ($LiNbO_3$), lithium triborate (LBO), beta-barium borate (BBO), cesium lithium borate (CLBO), lithium tantalite, stoichiometric lithium tantalite (SLT) potassium titanyl phosphate ($KTiOPO_4$ also known as KTP), ammonium dihydrogen arsenate (ADA), ammonium dihydrogen phosphate (ADP), cesium triborate ($CsB_3O_5$ or CBO), deuterated ammonium dihydrogen arsenate (DADA), deuterated ammonium dihydrogen phosphate (DADP), deuterated arginine phosphate (DLAP), rubidium di-deuterium phosphate ($RbD_2PO_4$ or DRDP), potassium aluminum borate (KABO), potassium dihydrogen arsenate (KDA), potassium dihydrogen phosphate (KDP), deuterated potassium dihydrogen phosphate ($KD_2PO_4$ or DKDP), $L_iB_4O_7$ (LB4), or lithium formate monohydrate (LFM) and isomorphs thereof, periodically poled materials such as periodically poled lithium niobate (PPLN), periodically poled lithium tantalite and periodically poled stoichiometric lithium tantalite (PPSLT).

Lithium Triborate $LiB_3O_5$ or LBO is an example of an interesting and useful nonlinear optical crystal. LBO is unique in many aspects, especially its wide transparency range, moderately high nonlinear coupling, high damage threshold and good chemical and mechanical properties. LBO crystal is also phase-matchable for second harmonic generation (SHG) and third harmonic generation (THG) of Nd:YAG and Nd:YLF lasers by using either type I or type II interaction. For SHG at room temperature, type I phase-matching can be reached and has maximum effective SHG coefficient in the principal XY and XZ planes in a wide wavelength range from 551 nm to about 3000 nm. LBO's transmission range is from 0.21 µm to 2.3 µm. LBO allows temperature-controllable non-critical phase-matching (NCPM) for 1.0-1.3 µm, Type I SHG, and also provides room temperature non-critical phase matching (NCPM) for Type II SHG at 0.8-1.1 µm. LBO is also a desirable nonlinear optical material because it possesses a reasonable angular acceptance bandwidth, reducing the beam quality requirements for source lasers.

SHG conversion efficiencies of more than 70% have been observed with LBO for pulsed Nd:YAG lasers and 30% conversion efficiencies have been observed with LBO for continuous wave (cw) Nd:YAG lasers. THG conversion efficiency of over 60% for pulse Nd:YAG lasers have been observed with LBO. LBO is also an excellent nonlinear optical (NLO) crystal for an optical parametric oscillator (OPO) or optical parametric amplifier (OPA) with a widely tunable wavelength range and high output power. Thus, LBO is a desirable non-linear optical crystal for many applications.

However, LBO is a difficult material to work with. LBO is hygroscopic and expensive. In an optical system, the LBO crystal needs to be clean, stable, e.g., perfectly still, typically one must control the temperature of the crystal to within 0.1 C°. In addition, the mounting of the crystal is critical due to the unusually anisotropic thermal expansion of LBO. In particular, LBO has coefficients of thermal expansion of $10.8 \times 10^{-5}/K$, $-8.8 \times 10^{-5}/K$, and $3.4 \times 10^{-5}/K$ for its x, y and z crystal axes, respectively. Optical considerations determine the cut of the crystal, i.e., phase matching. For example, a second harmonic generation (SHG) cut for LBO is easier to implement than a third harmonic generation (THG) cut. Likewise, a mounting system for SHG is easier than for THG.

The properties of LBO make it particularly difficult to mount in an oven. In the past, laser systems have used glue or a clamping mechanism (e.g., spring loads) to secure an LBO crystal to the oven for SHG or THG. Other systems have used gold flash and solder to mount LBO crystals. To avoid damage to the crystal due to anisotropic thermal expansion, a small dot of glue may be used to mount the LBO (5-mm to 15-mm long) crystal to the oven. To reduce strain, the glue is then typically cured near room temperature. However, a single dot of glue may not be sufficient to hold the LBO crystal securely and stably while protecting the crystal from chipping or cracking. Another problem is that the thermally anisotropic LBO is usually glued to a thermally isotropic metal. A mismatch in coefficients of thermal expansion (CTE) between the LBO and the metal results in differences in thermal expansion that often break the LBO crystal. Furthermore, methods involving adhesives such as glue or solder and/or mechanical clamping have significant drawbacks such as crystal chipping and cracking, or mechanical instability.

It is within this context that embodiments of the present invention arise.

BRIEF DESCRIPTION OF THE DRAWINGS

Other objects and advantages of the invention will become apparent upon reading the following detailed description and upon reference to the accompanying drawings in which:

FIG. 1A is a partially exploded cut away three-dimensional view of a crystal mount illustrating mounting of a non-linear optical crystal according to an embodiment of the present invention.

FIG. 1B is a cross-sectional view of the crystal mount of FIG. 1A taken along line B-B of FIG. 1A.

FIG. 2A is a partially exploded cut away three-dimensional view of a crystal mount for mounting of an LBO crystal according to an embodiment of the present invention.

FIGS. 2B-2D are partial cross-sectional views illustrating alternative configurations for a corner relief channel in a crystal mount according to an embodiment of the present invention.

FIGS. 6A-6B are cross-sectional diagrams illustrating an example of a crystal mount that uses a chamfered crystal according to an alternative embodiment of the present invention.

FIGS. 7A-7B are cross-sectional diagrams illustrating examples of crystal mounts according to other alternative embodiments of the present invention.

DESCRIPTION OF THE SPECIFIC EMBODIMENTS

Figure 3A:
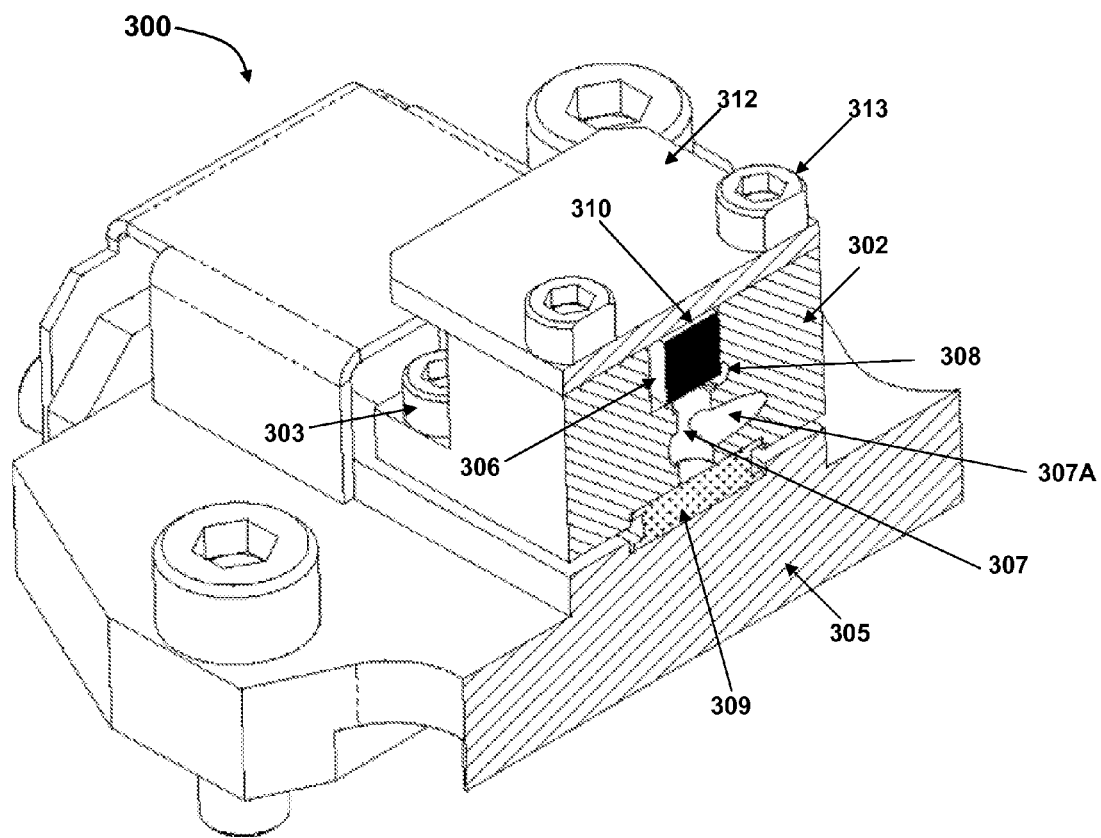
FIG. 3A is a three-dimensional cut-away view illustrating mounting a crystal in accordance with an embodiment of the invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Glossary:

As used herein:

Beam splitter refers to an optical device capable of splitting a beam of light into two or more parts.

Brillouin scattering refers to a nonlinear optical phenomenon involving spontaneous scattering of light in a medium due to interaction between the light and sound waves passing through the medium.

Cavity or Optically Resonant Cavity refers to an optical path defined by two or more reflecting surfaces along which light can reciprocate or circulate. Objects that intersect the optical path are said to be within the cavity.

Continuous wave (CW) laser refers to a laser that emits radiation continuously rather than in short bursts, as in a pulsed laser.

Duty Cycle (D) refers to the product of the pulse duration $\tau$ and the pulse repetition frequency (PRF) for pulses that occur at regular intervals. The duty cycle may be expressed as a ratio, for example, 0.01 or equivalently may be expressed as a percentage, for example 1%.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through an amplifier. The term "unsaturated gain" refers to the increase of a small signal passing through the amplifier, which does not significantly change the inversion level in the amplifier. As used herein gain and unsaturated gain will be used interchangeably.

Gain Medium refers to a material capable of generating optical gain as described below with respect to a Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and similar.

Infrared Radiation refers to electromagnetic radiation characterized by a vacuum wavelength between about 700 nanometers (nm) and about 100,000 nm.

Laser is an acronym of light amplification by stimulated emission of radiation. A laser is a cavity that contains a lasable material. This is any material—crystal, glass, liquid, semiconductor, dye or gas—the atoms of which are capable of being excited to a metastable state by pumping e.g., by light or an electric discharge. Light is emitted from the metastable state by the material as it drops back to the ground state. The light emission is stimulated by the presence of a passing photon, which causes the emitted photon to have the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since the two values are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like. Optical fiber can also be induced to have a non-linear response to optical radiation by fabricating microstructures in the fiber.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multiwave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Duration ($\tau$) refers to the temporal duration or lifetime of a repetitive signal, e.g., the time interval between the half-power points on the leading and trailing edges of the pulse. Pulse duration is sometimes referred to as "pulse width".

Pulse Energy refers to the amount of energy in a pulse. Pulse energy may be calculated by integrating instantaneous pulse power over the pulse period.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as $(2\pi)\times$(average energy stored in the resonator)/ (energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with acousto-optic or electro-optic modulators or saturable absorbers, a giant pulse is generated.

Quasi-CW refers to generating a succession of pulses at a high enough repetition rate to appear continuous.

Quasi Phase-matched (QPM) Material: In a quasi-phase-matched material, the fundamental and higher harmonic radiation are phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Raman Scattering refers to a scattering of incident light by matter in which the scattered light has a lower frequency than the incident light. The difference between the frequencies of the incident and scattered light (referred to as the Raman shift) corresponds to a natural vibrational frequency of the scattering material.

Saturation of an optical amplifier refers to a decrease of the gain coefficient of a medium near some transition frequency when the power of the incident radiation near that frequency exceeds a certain value. If the gain coefficient is constant, the power emitted by the medium is proportional to the incident power. However, there is typically a limit to the rate at which a gain medium can emit power. This limit depends on the lifetimes of the energy levels involved. As this limit is reached, the stimulated transitions become rapid enough to significantly lower the upper energy level population, thereby decreasing the gain coefficient. The effect is to "flatten" the amplified power as a function of input power.

Stimulated Brillouin Scattering refers to a type of amplification process in which intense light causes deformation of a crystal lattice that generates ultrasonic waves in the lattice.

Stimulated Raman Scattering (SRS) is a type of Raman scattering that can occur with an intense optical beam. The Raman-scattered light experiences gain and its power increases exponentially. If the power of the incident light exceeds a threshold value, a large portion of the incident light is converted to Raman-scattered light having a lower frequency than the incident light. SRS is also sometimes known as the stimulated Raman effect or coherent Raman effect.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Saturation Intensity ($I_{sat}$): The intensity which reduces the gain of an amplifier to half of its small-signal value. An amplifier is said to be saturated if the signal intensity passing through the amplifier is significantly larger than the saturation intensity.

Introduction

Embodiments of the present invention take advantage of the Applicants' accidental discovery that an LBO crystal can be securely and stably mounted in a crystal oven mount with glue applied to an edge of the crystal. The nature of the discovery can be understood with reference to FIG. 1A and FIG. 1B. Specifically, as seen in FIG. 1A, a non-linear optical crystal 101 is typically mounted in a channel 102 formed in a block of metal 104. The crystal 101 may be a lithium triborate (LBO) crystal. Alternatively, the crystal 101 may be made of another non-linear optical material, such as lithium niobate (LiNbO$_3$), beta-barium borate (BBO), cesium lithium borate (CLBO), lithium tantalite, stoichiometric lithium tantalite (SLT) potassium titanyl phosphate (KTiOPO$_4$ also known as KTP), ADA, ADP, CBO, DADA, DADP, DKDP, DLAP, DRDP, KABO, KDA, KDP, LB4, or LFM and isomorphs thereof The crystal 101 may also be made of a periodically poled material such as periodically poled lithium niobate (PPLN), periodically poled lithium tantalite and periodically poled stoichiometric lithium tantalite (PPSLT).

The crystal 101 is generally in the shape of a rectangular parallelepiped having six faces. The crystal has edges E where two faces meet and corners C where two edges meet. The channel 102 is slightly wider than the crystal 101. A bottom face F$_b$ and one side face F$_s$ of the crystal abut a bottom and side wall of the channel 102. As seen in the cross-section in FIG. 1B, the corners of the crystal are quite square. Unfortunately, conventional machine tools cannot form a channel with perfectly square corners. To economically accommodate the square corner of the crystal 101 the channel 102 normally includes a corner relief channel 103.

By way of example, the crystal 101 may have a length of about 15-20 mm, a width of about 2-3 mm and a height of about 2-3 mm.

Conventionally, the crystal is mounted in the channel by applying a small amount of adhesive 105 to one of the faces, e.g., the bottom face F$_b$. The adhesive 105 can be applied to the crystal with a syringe through an injection port 106. Prior to the Applicants' discovery, it was common practice to limit the amount of glue applied to the crystal and to avoid overflow of glue into the corner relief channel 103. This is because cracks tend to propagate from the corners and edges of crystals and it was believed that securing the crystal in the channel 103 with glue applied to the edges would lead to such cracks.

On one occasion, quite by accident, one of the Applicants applied too much glue to the injection port 106 while mounting an LBO crystal. The excess glue overflowed into the corner relief channel 103 and onto the edge of the crystal received in the corner relief channel. The Applicants would ordinarily reject and discard such a crystal and mount. However, due to a shortage of parts for crystal mounts, the Applicants decided to test the resulting mounted crystal for stability. Much to the Applicants' surprise, the LBO crystal was stably mounted in the channel, without cracks.

Based on this discovery, a method for mounting a non-linear optical crystal, a crystal mount for an optical system, and a wavelength converted laser system have been developed in accordance with embodiments of the present invention.

Embodiments

FIG. 2A illustrates an example of mounting a crystal and an inventive crystal mount in accordance with embodiments of the present invention.

According to an embodiment of the present invention, a non-linear optical crystal 201 having an anisotropic coefficient of thermal expansion can be securely mounted. By way of example, the crystal may be made of lithium triborate (LBO) or another non-linear optical material. The crystal is placed in a channel 202 formed in a block of material 204. A bottom face F$_b$ of the crystal 201 aligns with and abuts a bottom B of the channel 202. A side face F$_s$ of the crystal 201 aligns with and abuts a side wall S of the channel 202. The crystal is secured in the channel 202 by an adhesive 205 applied along a portion of the bottom face and/or side face proximate an edge E of the crystal 201 where the bottom and side faces of the crystal meet.

The channel 202 generally includes a corner feature located at an intersection of the bottom B and sidewall S. The corner feature receives the edge E such that the side face F$_s$ and bottom face F$_b$ of the crystal respectively abut the side wall S and bottom B of the channel. The corner feature may be a corner that is sufficiently square to receive the edge E. Alternatively, the corner feature may optionally include a corner relief channel 203 that receives the edge E. FIGS. 2B-2D illustrate possible examples of cross-sections for the corner relief channel. The adhesive may be applied with a syringe through an injection port 206 that communicates with the channel 202. The corner relief channel may include one or more glue wells 208 to restrict the spread of the adhesive along the edge E. By way of example, and not by way of limitation, the glue wells 208 may be located on either side of the injection port 206. Excess adhesive can flow into the glue wells, thereby limiting the extent to which adhesive is applied to the edge E. For example, if the glue wells 208 are large enough and deep enough, the overflow of glue along the edge E can be limited to the portion between the two glue wells, thereby controlling the adhesive interface length.

Figure 3B:
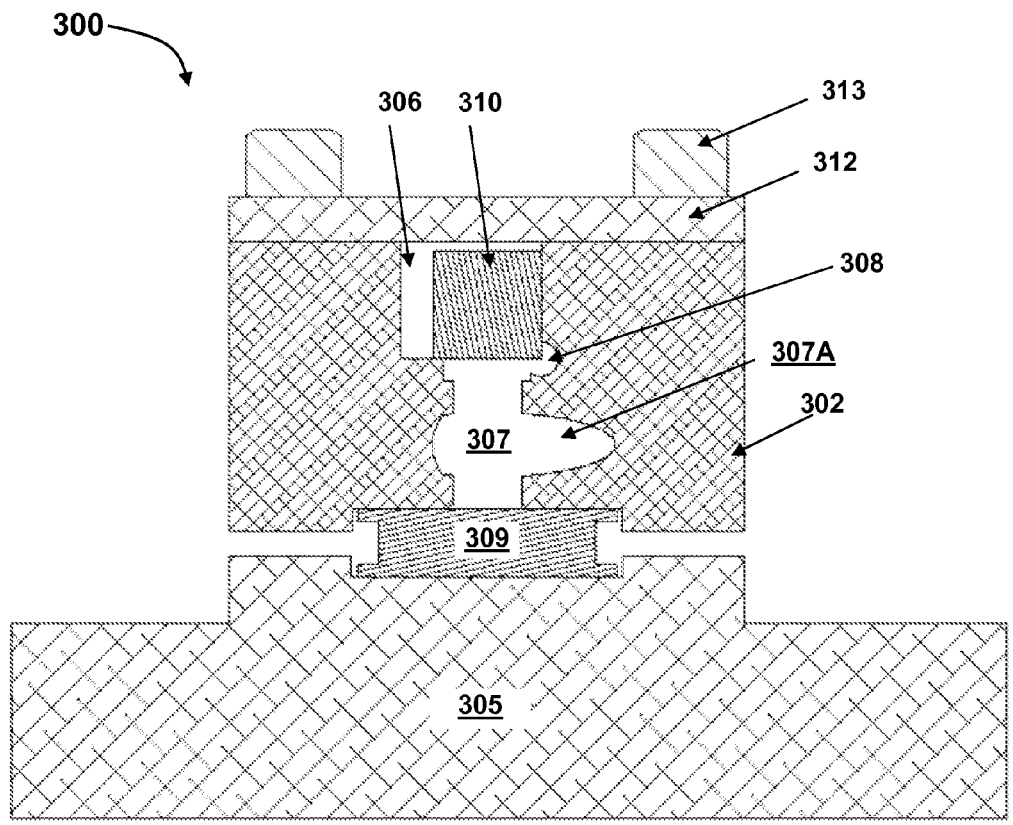
FIG. 3B is a cross-sectional view of the crystal mount depicted in FIG. 2A taken along line B-B of FIG. 3A.

FIGS. 3A-3B depict a crystal mount 300 according to an embodiment of the present invention. As shown in these figures, the crystal mount 300 may generally include an oven body 302 in the form of a metal block which may be secured to an oven base 305, e.g., by screws 303 and/or adhesives. A cooling element 309, e.g., a thermoelectric (Peltier effect) cooler can be mounted between the block 302 and the base 305 for temperature control of the crystal 310.

The block 302 includes a channel 306 for receiving a non-linear optical crystal 310, e.g., an LBO crystal or a crystal of another non-linear optical material. Adhesive may be injected into the channel through an injection port 307. A glue well 307A may communicate with the injection port at a right angle to control overflow of adhesive during injection. A corner relief channel 308 is formed in the block at an edge when a bottom and sidewall of the channel meet. Although a round corner relief is shown in FIGS. 3A-3B, the shape of the corner relief may alternatively be another shape, such as any of the shapes shown in FIGS. 2B-2D. The corner relief 308 can be formed after the channel is formed, e.g., with a slitting saw, dovetail cutter, or EDM. Alternatively, the corner relief 308 may be formed in the block before forming the channel, e.g., by pre-drilling a round hole in the block 302 and then machining the channel 306 (e.g., with a milling machine) so that the channel partly overlaps the pre-drilled hole. Glue wells (not shown) may be formed, e.g., by drilling through the block 302 from its bottom to intersect the corner relief The size and spacing between two glue wells may be selected to control the length of crystal to which the adhesive is applied.

According to a preferred embodiment of the present invention, about 5-15 mm of glue contact along the edge E of the crystal and about 0.25-0.5 mm from the edge along the faces of the crystal that abut the bottom and sidewall of the channel 306 also work well with holding the crystal 310. Adhesive can be placed into the corner relief 308 before mounting the crystal 310 to control the length of the gluing. In one working example, 15-20 mm crystals were stably mounted with about 10 mm of glue contact along the edge E.

The adhesive used to secure the crystal 310 in a crystal mount 300 may be a glue that is recoverably elastic, non-migratory, and can handle varying coefficient of thermal expansion (CTE). The adhesive can shrink slightly as it cures. Examples of suitable adhesives include, among others, two-part adhesives such as epoxies and encapsulants. By way of example, but not by way of limitation some specific examples of suitable adhesives that can be used to secure an LBO crystal in embodiments of the present invention include the following.

a) Silicone Elastomer Encapsulants, e.g., NuSil Tech SCV-2590-2, NuSil Tech CV-2964, which are available from NuSil Technology of Santa Barbara, Calif., and Sylgard® 160 and Dow Corning 93-500, available from Dow Corning Corporation of Midland, Mich., b) Epoxies, e.g., Epo-Tek 353ND from Epoxy Technology, Inc. of Billerica, Mass.; or Castall E-301/RT-1 from Lord Corporation, of Cary, N.C.; Emerson & Cuming 2651-40/CAT 11, Epoxy Technologies, Tra-Bond 2151, Tra-Bond 2158, Tra-Bond 2254, or Tra-Bond 2903 from Tra-Con, Inc. of Bedford Mass., c) High-temperature ceramic adhesives such as Ceramabond 835M from Aremco Products, Inc. of Valley Cottage, N.Y., d) Urethanes, e.g., PR 1564 A/B from PRC-DeSoto International, Inc., of Glendale, Calif. or Arathane 5753 A/B from Hunstman Corporation of Salt Lake City, Utah.

d) UV Curable adhesives (e.g., epoxies or acrylics), such as Norland 40 or 70 series from Norland Products of Cranbury, N.J. and Master Bond UV 15-Th from Master Bond Inc. of Hackensack, N.J.

Figure 4:
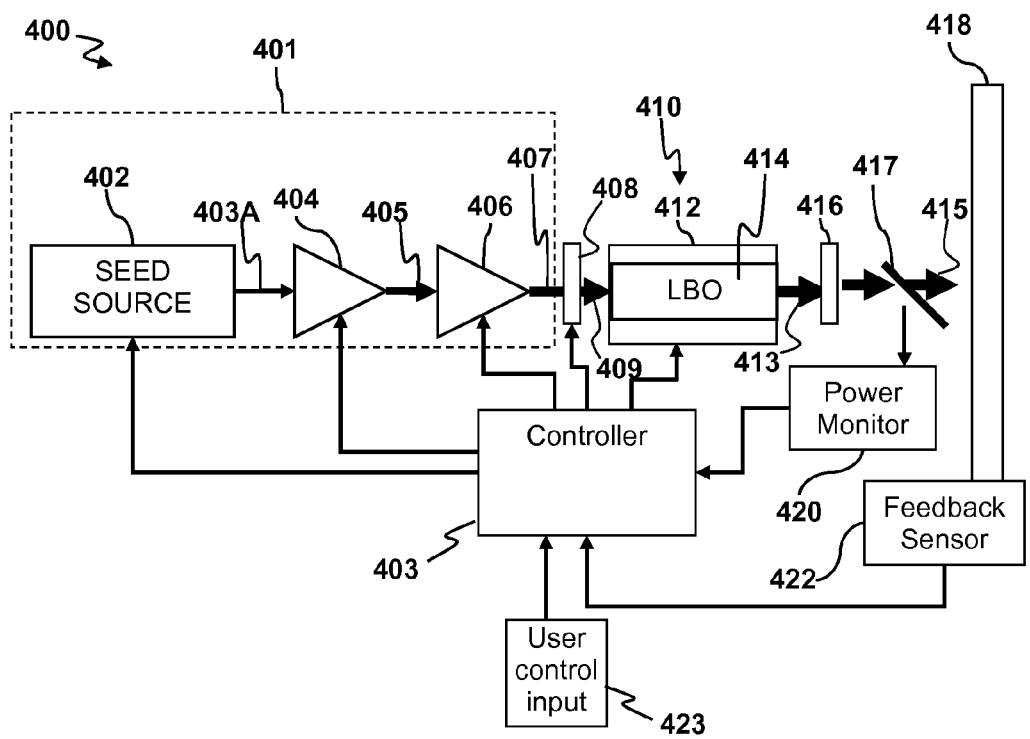
FIG. 4 is a schematic diagram of a wavelength-converted laser system according to an embodiment of the present invention.

FIG. 4 depicts an optical system 400 according to an embodiment of the present invention. Specifically, the system 400 generally includes a source of primary radiation 401, an optional controller 403, and a wavelength converter 410. The source of primary radiation 401 may include a seed source 402, one or more optional optical pre-amplifiers 404, and an optical power amplifier 406. The wavelength converter 410 includes a LBO crystal mounted in a crystal mount as described above in FIGS. 2A-2D and 3A-3B. The wavelength for phase matching in the crystal is changed by heating or cooling the crystal.

In the system 400 the seed source 402 may generate seed radiation 403A, which may be amplified by optional preamplifiers 404 to generate an input signal 405, which can be further amplified by the power amplifier 406 to produce an amplified output 407. Alternatively, the pre-amplifiers may be omitted and the seed radiation 403A may be used as the input signal 405. It is further noted that embodiments of the present invention may generate primary radiation with a suitable source that does not require amplification by either pre-amplifiers or a power amplifier.

As is well known in the art, input coupling optics 408, e.g., bandpass filters and optical isolators, may be placed between the power amplifier 406 and the wavelength converter 410 to prevent backward propagating beams and minimize the effects of unseeded spontaneous emission as well as condition the amplified beam for maximum conversion efficiency.

By way of example, and not by way of limitation, the seed source 402 may include a semiconductor laser and the seed radiation 403A can be in the form of coherent light. The seed radiation 403A produced by the seed source 402 may be in the near-IR or visible portions of the electromagnetic spectrum. For example, the seed radiation 403A may be characterized by a vacuum wavelength in a range from about 630 nm to about 3000 nm. Optical signals having wavelengths within this range may be obtained with a variety of semiconductor lasers fabricated on different substrates.

There are a number of different possible designs for the seed source 402. By way of example and not by way of limitation, the seed source 402 may be a semiconductor diode laser, such as a Distributed Feedback (DFB) or Distributed Bragg Reflector (DBR) type semiconductor diode laser. Semiconductor lasers may be pumped by driving electric current through the diode. Other types of lasers may be used as the seed source. As such, embodiments of the present invention are not limited to any particular seed source.

The amplified output 407 from the optical power amplifier 406 can be optically coupled to the wavelength converter 410. A nonlinear optical process occurring within the wavelength converter 410 wavelength converts at least a portion of the amplified output 407 to produce a wavelength converted output 409. The amplified output 407 preferably has sufficient optical intensity to provide a desired conversion efficiency for the nonlinear optical process occurring in the wavelength converter. The system 400 may also include output coupling optics 416 that receive the wavelength-converted output 409 and transmit a final output 413. The coupling optics 416 may include simple windows and may also include an optical fiber.

The wavelength converter 410 may be configured as described above with respect to FIGS. 2A-2D and/or 3A-3B. Specifically, the wavelength converter may include a include a crystal mount 412 having a channel configured to receive a nonlinear crystal 414 such as an LBO crystal. The crystal 414 may be oriented to a specific nonlinear conversion process, such as second harmonic generation (SHG) and third harmonic generation (THG). The channel may include a corner relief feature that receives an edge of the crystal 414. The crystal 414 may be secured in the channel by an adhesive applied along the edge of the crystal that is received in the corner relief feature. The crystal mount 412 may include a heating element and/or Peltier cooling element along with temperature sensors that are operably coupled to the controller 401. The controller may adjust phase-matching of the nonlinear optical process occurring in the crystal 412 by changing the temperature of the crystal mount 412 and/or crystal 414. The temperature may be stabilized, e.g., by operating the Peltier cooling element or heating element in a feedback loop with the temperature sensor.

It is noted that for the purposes of example, wavelength converter 410 is shown in an extra-cavity configuration, i.e., the crystal 412 and crystal mount 414 are located outside a laser cavity. However, embodiments of the present invention include configurations in which the crystal 412 is mounted within a laser cavity.

The controller 403 may also be operably coupled to the seed source 402 and/or optional optical preamplifiers 404, or power amplifier 406. The controller may include logic adapted to control pulse characteristics of the seed radiation 403A, such as a pulse width $\tau$, and pulse repetition frequency of seed source 402. By way of example, where the seed source 402 is a semiconductor diode laser, controller 403 may send control signals to an electrical drive circuit 422 used to pump the seed source. The control signals may be configured to adjust the operating parameters of the electrical drive circuit 422. In alternative embodiments, the seed source radiation 403A may be spectrally controlled through actuators on the seed source, e.g., applying a current pulse which heats the grating section of a DBR laser used as the seed source 402. The controller 403 may adjust the wavelength-converted average power and/or pulse energy, pulse duration $\tau$, pulse period T, or pulse duty cycle in response to user control inputs 423. In some embodiments, the system controller 403 may operate in response to one or more feedback signals. For example, a portion of the final output 413 may be deflected, e.g., by a beamsplitter 417 to a power monitor 420. A remaining output 415 may be coupled to a target 418. Alternatively, the final output 413 may be coupled directly to the target 418.

The final output 413 or remaining output 415 may be delivered to any of a number of different types of targets to implement any of a number of different types of processes depending on the application. Applications for the system 400 include, but are not limited to, material processing, medical treatments, laser particle accelerators, and wafer inspection. Examples of suitable materials for the target 418 include, but are not limited to, metals, ceramics, semiconductors, polymers, composites, thin films, organic materials, in vitro or in vivo biological samples, and elementary particles. In the particular case of material processing, targets may include, e.g., wires, printed circuit (PC) boards, integrated circuit (IC) packages, IC wafers dies, LED wafers, packages, dies and the like. Examples of material processing applications include surface texturing, heat treatment, surface engraving, fine micro-machining, surface ablation, cutting, grooving, bump forming, coating, soldering, brazing, sintering, sealing, welding, link blowing, wafer scribing, dicing and marking, via drilling, memory repair, flat panel display repair, stereolithography, maskless lithography, surface diffusion and surface conversion to a compound.

In addition to the above-mentioned components, the optical system 400 may further include other optical components that are well known in the art. Such components may include optical isolators to avoid deleterious effects of back reflection of the laser radiation 403, amplified output 407, final output 413 or remaining output 415. Other examples of optical components include, but are not limited to, spectral filters to avoid deleterious effects of amplified spontaneous emission (ASE) and waveplates to rotate the polarization state of the seed radiation 403, amplified output 407, final output 413 or remaining output 415 to a desired orientation. Alternatively seed source 402 could be an amplified stimulated emission (ASE source), a mode locked source, a narrow frequency source.

Figure 5:
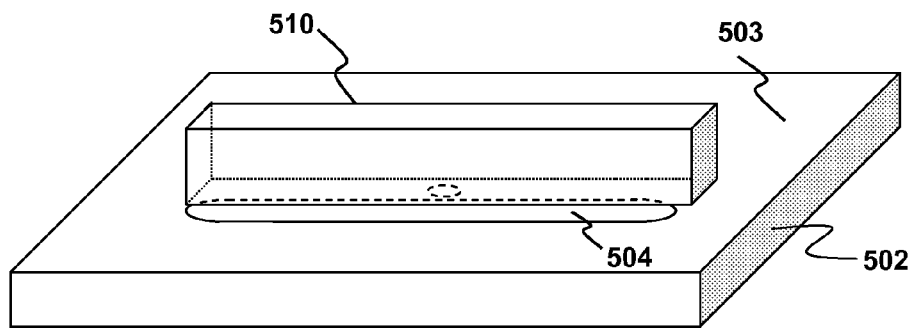
FIG. 5 is a schematic three dimensional diagram illustrating a crystal mount according to an alternative embodiment of the present invention.

In embodiments of the present invention, a key feature is that adhesive is applied to an edge of the crystal which results in a low strain condition, even if there is a CTE mismatch between the crystal and the mounting block. Although in examples described above the crystal is mounted in a channel, embodiments of the invention are not limited to this configuration. In alternative embodiments, the crystal may be mounted to the surface of a mounting block using an adhesive along an edge of the crystal. By way of example, FIG. 5 illustrates an example of an embodiment in which a crystal 510 is mounted to a block 502 having a flat surface 503. The crystal is mounted with a bottom face of the crystal abutting the surface 503 of the block 502. Adhesive is applied along an edge of the crystal and adheres to the block 502 and the bottom face and/or a side face of the crystal 502. The block may include glue channel 504 to retain the glue. Alternatively, the glue may be applied directly to the surface 503. The block may include an injection port 506 for delivering the glue to the surface 503 and/or the glue channel 504.

Other variations on the concept of mounting a crystal with an adhesive along an edge of the crystal are within the scope of embodiments of the present invention. For example, embodiments of the present invention may utilize a channel in conjunction with a chamfered crystal. Specifically, as depicted in FIGS. 6A-6B a crystal 601 can be mounted in a rectangular channel 602 formed in a mounting block 604. The crystal 601 may include a chamfered edge E adjacent a side face $F_S$ and a bottom face $F_B$ of the crystal. The chamfer in the edge can accommodate a less-than-perfectly square corner of the channel 602. The crystal may be secured in the channel with adhesive 605 applied to a corner of the channel. The adhesive secures the crystal to the block 604 by adhering to a bottom B and/or sidewall S of the channel and to the bottom face $F_B$ and/or side face $F_S$ of the crystal 610. The mounting block 604 may optionally include an injection port 606 and one or more glue relief wells 608.

In other embodiments, a chamfered crystal may be used in conjunction with a mounting block similar to that shown in FIG. 5. For example, as shown in FIG. 7A, a crystal 701 having a chamfered edge E can be mounted to surface 703 of a mounting block 702. The surface 703 may be substantially flat, i.e., flat to within the same degree of flatness as the bottom face $F_B$ of the crystal. The block 702 may optionally include an injection port 706 for injecting adhesive 705 and a glue channel 708 to receive the adhesive for mounting the crystal 701. In another alternative embodiment depicted in FIG. 7B the crystal 701 can be secured to the surface 703 of a block 702' having neither glue channel nor injection port. The crystal can have a chamfered edge although this is not strictly necessary for the embodiments depicted in FIGS. 7A-7B.

Experimental Results

A series of investigations have been completed into the stability of a laser system that uses a crystal mounted as illustrated in FIG. 3 and with a prior art crystal mount. The prior art crystal mount used only a small dot of glue. The crystal was observed to creep and twist by enough to visibly see with the naked eye. This is estimated to correspond to about 0.25-0.5 mm movement of a 15-20 mm long crystal at one end. This also equates to a beam pointing change on the order of 1000's of micro radians. The crystal would move or shift under very light shock loads (estimated at less than about 20 G) This would result in unacceptable beam performance. Specifically, roundness would go way out of specification and power would be expected to drop by 50-75%.

Other state of the art ovens that the inventors have worked on have been observed to move as much as 1000 micro radians. This includes clamped designs as well as designs that use both glue and clamp as well as small dot of glue designs. These other ovens were both intracavity and extracavity and the movement was always a big problem. State of the art LBO ovens have a difficult time achieving thermal cycling from 0 C->40 C let alone a more standard shipping spec of −20 C->50 C.

It is known to laser engineers skilled in the art that optical components for lasers, including nonlinear optical crystals, need to be routinely mounted and held to considerably less than 100 microradians of rotation. It is noted that rotation is far more critical on a flat surface than pure translation. The inventors believe that embodiments such as that depicted in FIGS. 3A-3B can typically mount an LBO crystal to within around 10 microradians of long term stability. It is further noted that it is very difficult to measure movements below 100 micro radians without specialized tooling, such as quad cells or interferometers. In the absence of such tools, the rotational stability is an estimate since the measured rotation is less than can be otherwise measured.

Dozens of drop tests have been performed on a laser head that uses a crystal mount of the type shown in FIG. 3. Most drops were ⅜" height onto a stainless steel table top. The inventors have seen no measurable movement of this oven design. Therefore, it is believed that the new design is stable to better than 100 micro radians under severe shock loads (80-120 g estimated from an impact duration of about 10 ms). It is estimated to be below 25 micro radians.

In addition to shock tests, thermal cycle tests have been performed. The inventors also saw no movement after nearly 100 oven thermal cycles from 5 C to 45 C. Additionally, no movement was observed after over 1 million more moderate laser standby cycles. In all of the above cases, no fractures (or beginnings of fractures) of the crystal were evident.

Embodiments of the present invention facilitate optical wavelength conversion using LBO by providing stable mounting of an LBO crystal. The stability and robustness of the LBO mounting is remarkable considering the simple and counterintuitive manner in which the crystal is mounted using adhesive applied to an edge of the crystal.

A key aspect of embodiments of the present invention is that they allow much more glue to be used to secure a crystal than in previous designs, without CTE mismatch induced "cracks". Up to a point the use of more glue in mounting typically leads to a more stable mount.

Embodiments of the present invention solve the problems of physically cracking LBO during mounting. Such problems are common with large surface area glue bonds or mechanical cracking and strain from a clamp. Also, positional stability of mounting is greatly improved over a small dot of glue and clamps without risking cracking due to the large surface area bond or clamping forces. The larger "edge" bond holds the crystal very stable and does not create problems with cracking or chipping of the LBO.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A crystal mount, comprising:
   a mounting block configured to receive a nonlinear optical crystal;
   a nonlinear optical crystal mounted to the mounting block with a face of the crystal abutting a surface of the mounting block; and
   an adhesive that secures the crystal to the mounting block by adhering to the mounting block and to a corresponding portion of the bottom or side, or bottom and side face of the crystal along an edge of the crystal, wherein the adhesive is disposed on less than an entire area of the bottom face.

2. The crystal mount of claim 1, wherein the mounting block includes a channel configured to receive the nonlinear optical crystal, wherein the channel includes a corner feature located at an intersection of a bottom and sidewall of the channel, wherein the corner feature is configured to receive an edge of the crystal located at an intersection of a bottom face and a side face of the crystal that respectively abut the bottom and sidewall of the channel.

3. The crystal mount of claim 2, further comprising one or more glue wells that intersect the corner feature, wherein the glue wells are configured to restrict a length of the adhesive along the edge of the crystal.

4. The crystal mount of claim 2, wherein the corner feature includes a corner relief feature that receives the edge of the crystal.

5. The crystal mount of claim 4, wherein the corner relief feature includes a corner relief channel and wherein the adhesive is applied in the corner relief channel.

6. The crystal mount of claim 5, wherein the mounting block includes one or more glue wells that intersect the corner relief channel.

7. The crystal mount of claim 1, wherein the nonlinear optical crystal is characterized by anisotropic coefficient of thermal expansion that is characterized by a negative coefficient of thermal expansion along one axis and a positive coefficient of thermal expansion along one or more other axes.

8. The crystal mount of claim 7, wherein the nonlinear optical crystal comprises lithium triborate (LBO).

9. The crystal mount of claim 7, wherein the adhesive is applied along the edge for a distance of about 5 mm to 15 mm.

10. The crystal mount of claim 1 wherein the adhesive extends along the side and/or bottom face about 0.25 mm to about 0.5 mm from the edge.

11. The crystal mount of claim 1, wherein the adhesive material is selected from the group consisting of Silicone Encapsulants, Epoxies, Urethanes and UV Curable adhesives.

12. An optical system, comprising:
    a source of primary radiation; and
    a wavelength converter optically coupled to the source of primary radiation, wherein the wavelength converter includes a crystal mount, wherein the crystal mount comprises:
      a mounting block configured to receive a nonlinear optical crystal;
      a nonlinear optical crystal mounted to the mounting block with a face of the crystal abutting a surface of the mounting block; and
      an adhesive that secures the crystal to the mounting block by adhering to the mounting block and to a corresponding portion of the bottom or side, or bottom and side face of the crystal along an edge of the nonlinear crystal, wherein the adhesive is disposed on less than an entire area of the bottom face.

13. The system of claim 12, wherein the mounting block includes a channel configured to receive the nonlinear optical crystal, wherein the channel includes a corner feature located at an intersection of a bottom and sidewall of the channel, wherein the corner feature is configured to receive an edge of the crystal located at an intersection of a bottom face and a side face of the crystal that respectively abut the bottom and sidewall of the channel.

14. The system of claim 13, further comprising one or more glue wells that intersect the corner feature, wherein the glue wells are configured to restrict a length of the adhesive along the edge of the crystal.

15. The system of claim 14, further comprising one or more glue wells that intersect the corner feature, wherein the glue wells are configured to restrict a length of the adhesive along the edge of the crystal.

16. The system of claim 14, wherein the corner feature includes a corner relief feature that receives the edge of the crystal.

17. The system of claim 16, wherein the corner relief feature includes a corner relief channel and wherein the adhesive is disposed in the corner relief channel.

18. The system of claim 17, further comprising one or more glue wells that intersect the corner relief channel.

19. The system of claim 12, wherein the nonlinear optical crystal is characterized by anisotropic coefficient of thermal expansion that is characterized by a negative coefficient of thermal expansion along one axis and a positive coefficient of thermal expansion along one or more other axes.

20. The system of claim 19, wherein the nonlinear optical crystal comprises lithium triborate (LBO).

21. The system of claim 19, wherein the adhesive is applied along the edge for a distance of about 5 mm to 15 mm.

22. The system of claim 12 wherein the adhesive extends along the side and/or bottom face about 0.25 mm to about 0.5 mm from the edge.

23. The system of claim 12, wherein the nonlinear optical crystal is selected from the group of lithium niobate (LiNbO$_3$), lithium triborate (LBO), beta-barium borate (BBO), cesium lithium borate (CLBO), lithium tantalite, stoichiometric lithium tantalite (SLT) potassium titanyl phosphate (KTiOPO$_4$ also known as KTP), ADA, ADP, CBO, DADA, DADP, DKDP, DLAP, DRDP, KABO, KDA, KDP, LB4, or LFM and isomorphs thereof, periodically poled materials, periodically poled lithium niobate (PPLN), periodically poled lithium tantalite, and periodically poled stoichiometric lithium tantalite (PPSLT).

24. A crystal mount, comprising:
 a mounting block having a channel configured to receive a nonlinear optical crystal, wherein the channel includes a corner feature at an intersection of a bottom and sidewall of the channel, wherein the corner feature is configured to receive an edge of the crystal located at an intersection of a bottom face and a side face of the crystal, wherein the channel is configured such that the bottom face and side face of the crystal respectively abut the bottom and sidewall of the channel when the crystal is received in the channel with the edge received by the corner feature; and
 one or more glue wells that intersect the corner feature, wherein the glue wells are configured to restrict a length of adhesive along the edge of the crystal.

25. The crystal mount of claim 24, wherein the corner feature includes a corner relief feature that receives the edge of the crystal.

26. The crystal mount of claim 25, wherein the corner relief feature includes a corner relief channel.

27. A method for mounting a nonlinear optical crystal, comprising:
 receiving a nonlinear optical crystal on a mounting block; and
 securing the crystal to the mounting block with an adhesive that adheres to the mounting block and to a corresponding portion of a bottom or side, or bottom and side face of the crystal along an edge of the crystal, wherein the adhesive is disposed on less than an entire area of the bottom face.

28. The method of claim 27, wherein the mounting block includes a channel having a corner feature at an intersection of a bottom and sidewall of the channel, wherein the corner feature is configured to receive an edge of the crystal located at an intersection of a bottom face and/or side face of the crystal that respectively abut the bottom and/or sidewall of the channel, and
 wherein securing the crystal includes securing the crystal in the channel by adhering to the bottom and/or sidewall of the channel and to at least corresponding a portion of the bottom and/or side face of the crystal proximate the edge.

29. The method of claim 28, wherein the corner feature includes a corner relief feature that receives the edge of the crystal.

30. The method of claim 29, wherein the corner relief feature includes a corner relief channel and wherein the adhesive is disposed in the corner relief channel.

31. The method of claim 30, further comprising one or more glue wells that intersect the corner relief channel.

32. The method of claim 27, wherein the nonlinear optical crystal is characterized by anisotropic coefficient of thermal expansion that is characterized by a negative coefficient of thermal expansion along one axis and a positive coefficient of thermal expansion along one or more other axes.

33. The method of claim 32, wherein the nonlinear optical crystal comprises lithium triborate (LBO).

34. The method of claim 32, wherein the adhesive is applied along the edge for a distance of about 5 mm to 15 mm.

35. The method of claim 27 wherein the adhesive extends along the side and/or bottom face about 0.25 mm to about 0.5 mm from the edge.

36. The method of claim 27, wherein the adhesive material is selected from the group consisting of Silicone Encapsulants, Epoxies, Urethanes and UV Curable adhesives.

37. The method of claim 27, wherein the nonlinear optical crystal is selected from the group of lithium niobate (LiNbO$_3$), lithium triborate (LBO), beta-barium borate (BBO), cesium lithium borate (CLBO), lithium tantalite, stoichiometric lithium tantalite (SLT) potassium titanyl phosphate (KTiOPO$_4$ also known as KTP), ADA, ADP, CBO, DADA, DADP, DKDP, DLAP, DRDP, KABO, KDA, KDP, LB4, or LFM and isomorphs thereof, periodically poled materials, periodically poled lithium niobate (PPLN), periodically poled lithium tantalite, and periodically poled stoichiometric lithium tantalite (PPSLT).

* * * * *